Oct. 2, 1945.  W. W. EITEL  2,385,971

CHUCK

Filed April 3, 1943

INVENTOR
WILLIAM W. EITEL
BY
HIS ATTORNEY

Patented Oct. 2, 1945

2,385,971

UNITED STATES PATENT OFFICE 2,385,971

CHUCK

William W. Eitel, San Bruno, Calif., assignor to Eitel-McCullough, Inc., San Bruno, Calif., a corporation of California Application April 3 1943, Serial No. 481,784

1 Claim. (Cl. 279—41)

My invention relates to a chuck for holding a cylindrical object in a lathe or the like.

In mounting coaxial electrodes in the glass envelope of an electron tube it is important to align the electrodes with the envelope axis. This resolves itself to the problem of accurately centering the envelope in a chuck on the glass lathe. The difficulty here is that the glass envelopes as originally blown are not always truly cylindrical, but are apt to have irregularities in the surface.

The main object of my invention is to provide a chuck adapted to compensate for inequalities in the object without interfering with accurate centering thereof in the chuck.

The invention possesses other objects and features of advantage, some of which, with the foregoing, will be set forth in the following description of my invention. It is to be understood that I do not limit myself to this disclosure or species of my invention as I may adopt variant embodiments thereof within the scope of the claim.

Referring to the drawing.

Figure 1:
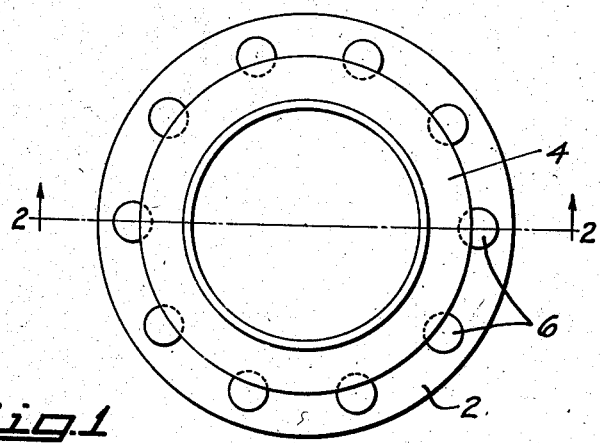
Figure 1 is an end elevational view of my chuck.
Figure 2:
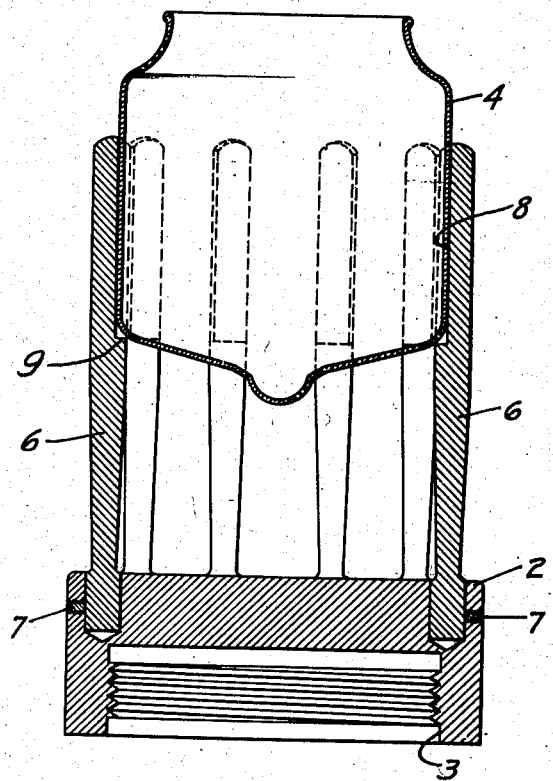
Figure 2 is a vertical sectional view of the same taken in a plane indicated by line 2—2 of Figure 1.

In terms of broad inclusion, my improved chuck comprises a base plate, and a series of resilient cantilever jaw-posts fixed at one end to the plate and disposed in a circle to engage the object at a plurality of spaced points about its circumference, whereby inequalities in the surface of the object are compensated for by individual springing of the jaw-posts without interfering with accurate centering of the objects in the chuck. Stops are also preferably provided on the posts for limiting axial movement of the object inwardly of the chuck.

In greater detail, and referring to the drawing, the chuck comprises a base plate or disk 2 having an interiorally threaded recess 3 for applying the plate to the head stock of a lathe. Cylindrical object 4 to be centered, such as a glass envelope, is held by a series of say ten jaw-posts 6 disposed in a circle to engage the object at a plurality of spaced points about its circumference. These posts are fixed at the inner ends to base plate 2 by suitable means, as by set screws 7.

Jaw-posts 6 form elongated fingers projecting from the plate and are of a resilient material, such as slender steel rods. Additional spring is imparted by tapering the posts somewhat toward their fixed ends. In order to afford a better grip the inner faces 8 of posts 6 are preferably flattened. Shoulders 9 at the ends of the flats provide stops for limiting axial movement of the object inwardly of the chuck. This axial positioning of a glass envelope is important in assembling tubes of the character described.

The principal feature of the chuck is that it automatically centers an envelope even though there are inequalities in the surface of the glass. In initially blowing the blanks or envelopes there is reasonable assurance that the article will be substantially cylindrical. Variations occur mostly in localized regions on the surface, manifested by small blisters or the like. With my chuck the relatively large number of bearing points insures accurate centering, the variations in the surface being compensated for by individual springing of the jaw-posts.

The resilient posts also take care of slight variations in diameter from article to article, without requiring manual adjustment, and insure a positive grip on the article at all times. The chuck has merit in high speed production plants, because no special settings, adjustments or other manipulation are required. Envelope 4 is merely pushed into the chuck; the independent springing of the jaw-posts automatically taking care of any variations in the blank.

I claim:

A chuck for centering a cylindrical object about the rotational axis of the head stock of a lathe, comprising a base plate adapted for mounting on said head stock, and a series of resilient cantilever jaw-posts fixed at one end to said plate and disposed in a circle concentric with said axis to engage the object at a plurality of spaced points about its circumference, whereby inequalities in the surface of the object are compensated for by individual springing of said jaw-posts without interfering with accurate centering of said object in the chuck, said jaw posts tapering toward their fixed ends and having flattened faces engageable with the object.

WILLIAM W. EITEL.